(12) United States Patent
Oka et al.

(10) Patent No.: US 7,821,447 B2
(45) Date of Patent: Oct. 26, 2010

(54) BIAS ADJUSTMENT OF RADIO FREQUENCY UNIT IN RADAR APPARATUS

(75) Inventors: Kenji Oka, Kobe (JP); Hiroshi Ito, Kobe (JP); Jun Ito, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 122 days.

(21) Appl. No.: 12/232,067

(22) Filed: Sep. 10, 2008

(65) Prior Publication Data

US 2009/0102702 A1  Apr. 23, 2009

(30) Foreign Application Priority Data

Sep. 18, 2007  (JP) .............................. 2007-241043

(51) Int. Cl.
G01S 13/00  (2006.01)
(52) U.S. Cl. .................. 342/175; 342/174; 342/195
(58) Field of Classification Search .............. 342/175
See application file for complete search history.

(56) References Cited

U.S. PATENT DOCUMENTS

| 3,936,750 | A | * | 2/1976 | Peil et al. ................. 455/144 |
| 5,101,173 | A | * | 3/1992 | DiPiazza et al. ............ 330/136 |
| 5,732,334 | A | * | 3/1998 | Miyake .................... 455/126 |
| 6,091,942 | A | * | 7/2000 | Buer et al. ............... 455/234.1 |
| 6,356,745 | B1 | * | 3/2002 | Lee et al. ................. 455/232.1 |
| 7,076,201 | B2 | * | 7/2006 | Ammar .................... 455/3.02 |
| 7,526,259 | B2 | * | 4/2009 | Yamaguchi .............. 455/127.1 |
| 2004/0023620 | A1 | * | 2/2004 | Sahota et al. ............. 455/91 |

FOREIGN PATENT DOCUMENTS

| JP | A-07-050527 | 2/1995 |
| JP | A-2000-068747 | 3/2000 |
| JP | A-2003-347867 | 12/2003 |
| JP | A-2005-227031 | 8/2005 |

* cited by examiner

Primary Examiner—Thomas H Tarcza
Assistant Examiner—Matthew M Barker
(74) Attorney, Agent, or Firm—Oliff & Berridge, PLC

(57) ABSTRACT

Disclosed is a method of bias adjustment for a millimeter wave radar apparatus that can efficiently and highly accurately adjust the bias of an MMIC used in a radio frequency circuit in the millimeter wave radar apparatus. The method comprises: providing a DA converter in a bias circuit in the millimeter wave radar apparatus comprising an antenna, a radio frequency unit, and a processing unit for performing transmission and reception processing of the radio frequency unit; connecting a signal generator in place of the antenna; and connecting a test processing unit and a control apparatus to the radio frequency unit, wherein the control apparatus applies an initial bias value in the form of a digital value to the MMIC, calculates the target value for the digital bias value based on the result of the measurement of the received signal, and takes the target value as the digital bias value for the production processing unit when the radio frequency characteristic of the received signal obtained by applying the target value to the MMIC lies within specified limits.

10 Claims, 8 Drawing Sheets

BIAS ADJUSTMENT OF RADIO FREQUENCY UNIT IN RADAR APPARATUS

CROSS-REFERENCE TO RELATED APPLICATION

This application claims priority from, and incorporates by reference the entire disclosure of Japanese Patent Application No. 2007-241043, filed on Sep. 18, 2007.

BACKGROUND OF THE INVENTION

1. Field of the Invention

The present invention relates to the bias adjustment of a radio frequency unit in a radar apparatus, and more specifically to a method for adjusting, at low cost and with good accuracy, the bias of a monolithic microwave integrated circuit (MMIC) built into a radio frequency circuit in a millimeter wave radar apparatus.

2. Description of the Related Art

It is known in the art to provide for use in a vehicle control system such as adaptive cruise control (ACC), a pre-crash system (PCS), or the like, a millimeter wave radar apparatus that uses millimeter waves in the frequency band of 30 GHz to 300 GHz as an apparatus for detecting obstacles (such as other vehicles, roadside constructions, pedestrians, etc.) around the vehicle. The currently used millimeter wave radar is of the type that employs a frequency-modulated continuous wave (FM-CW) system, and can measure the distance and relative velocity of a target by using a simple system.

A conventional millimeter wave radar apparatus comprises a transmitting/receiving antenna, a radio frequency unit connected to the transmitting/receiving antenna to transmit and receive radio waves (millimeter waves), an analog circuit incorporating a signal processing circuit for processing signals output from the radio frequency unit, a digital signal processor for digitally processing signals output from the analog circuit, and a communication interface for transmitting the signals processed by the digital signal processor to a vehicle system (ACC, PCS, etc.).

The antenna and the radio frequency unit are scanned together left and right by a motor contained in a scanner unit. The motor is driven by a motor driving circuit, which operates under the control of a signal supplied from the digital signal processor. The digital signal processor converts the beat signal produced by interference between the received wave and the transmitted wave into a digital signal, analyzes the beat frequency in its processing circuit, and detects the target's position by computing distance, relative velocity, and angle information. The radio frequency unit forming one component element of such a millimeter wave radar apparatus generally comprises a radio frequency circuit constructed from a plurality of MMICs (Monolithic Microwave Integrated Circuits) and a bias circuit for operating the MMICs.

Each MMIC contains a mixer, multiplier, amplifier, switch, etc., but the optimum point of the gate bias value for the mixer, multiplier, amplifier, etc varies in each MMIC. Further, in the radio frequency unit, since the transmit power and receive gain of the transmitter/receiver need to be adjusted to given target values, the bias value must be adjusted for each individual MMIC. Furthermore, since there exist variations in the gold ribbon connecting the MMICs, in the waveguide converter, and in the IF (Intermediate Frequency) circuit connected to the radio frequency circuit, beside variations among MMICS, bias adjustment has therefore been required.

The radio frequency unit in the millimeter wave radar apparatus includes a radio frequency circuit incorporating a plurality of MMICs, a bias circuit, and an IF circuit. Power is supplied to the radio frequency circuit and the bias circuit from a power supply circuit through respective regulators.

The MMICs built into the radio frequency circuit function as an oscillator, mixer, multiplier, amplifier, switch, etc., as described above, and are interconnected by a gold ribbon. The transmit signal output from the MMIC at the final stage is fed through the waveguide converter and the waveguide and transmitted out from the antenna. The signal reflected by the target and received by the antenna is input via the waveguide and the waveguide converter into the MMICs for processing, and the received signal processed by the MMICs is supplied to the IF circuit and sent to the analog circuit.

The analog circuit includes, in addition to the signal processing circuit, a microcomputer comprising a control processor, a memory, an I/O (Input/Output), and an external I/O. The signal from the I/F circuit is supplied via the signal processing circuit and the I/O to the control processor for processing, and the processed signal is output via the external I/O to the vehicle system.

The input side of each MMIC in the radio frequency unit is connected to a voltage dividing circuit comprising a trimmable resistor and a conventional resistor in the bias circuit. The bias circuit divides the output voltage of the regulator through the trimmable resistor and the conventional resistor, and applies the resulting bias value to the MMIC. In the prior art, the resistance set value of each trimmable resistor has been determined by examining the IF signal output from the IF circuit, and then, trimming of the trimmable resistor has been performed using the thus set value.

However, once the trimming is done, the value of the trimmable resistor can no longer be changed and as a result, there has been a problem that even if a temperature monitor is added, temperature compensation cannot be performed, and since determining whether the value is set correctly or not can only be checked in the inspection step, and therefore it is not possible to detect faults once the radar apparatus is shipped to the market.

In view of this, JP-A-2005-227031 discloses a bias adjustment method that uses a current monitor circuit for monitoring the sum of the drain currents flowing in the respective MMICs in accordance with the variations between the MMICs, and that converts the detection signal of the current monitor circuit into a digital signal, computes a gate voltage set value for producing a predetermined drain current, and applies the thus computed value to each MMIC through a D/A converter. According to the technique disclosed in JP-A-2005-227031, since expensive trimmer resistors are not used, not only the cost, but also the number of adjusting steps can be reduced compared with the conventional gate bias circuit that performs the adjustment using the bias control circuit constructed with trimmer resistors.

The technique disclosed in JP-A-2005-227031 obtains the gate voltage set value by monitoring the sum of the drain currents flowing in the respective MMICs and by determining the gate voltage set value so that the drain current value becomes equal to the predetermined current value; however, the purpose of the gate bias adjustment of the radio frequency unit is not only to adjust the optimum bias point of each MMIC, but also to adjust the radio frequency characteristics such as the transmitter power and receiver gain, and with the technique disclosed in JP-A-2005-227031 there has been the problem that highly accurate adjustment of the radio frequency characteristics cannot be accomplished because of large variations in the correlation between the drain current of each MMIC and the radio frequency characteristics.

SUMMARY OF THE INVENTION

Accordingly, it is an object of the present invention to provide a method of bias adjustment for a radio frequency unit in a millimeter wave radar apparatus that can efficiently and highly accurately adjust the bias of an MMIC used in the radio frequency unit in the radar apparatus. It is also an object of the invention to provide a radio frequency unit and a radar apparatus that can implement such a bias adjustment method.

To achieve the above object, there is provided according to the present invention a method of bias adjustment for a radio frequency unit in a radar apparatus, and more particularly a method for use in a radar apparatus comprising a transmitting/receiving antenna, a radio frequency unit connected to the transmitting/receiving antenna and containing at least one MMIC and a bias circuit for the MMIC, and a processing unit, connected to the radio frequency unit, for processing transmission and reception of radio waves, wherein the method is used for adjusting an analog bias value to be applied to the bias circuit.

In a first mode of the present invention, the bias circuit to which the method of the invention is applied is provided with a D/A converter which is connected to the gate terminal of the MMIC. In a second mode of the present invention, the bias circuit to which the method of the method is applied is provided with a D/A converter which is connected to the gate terminal of the MMIC and an A/D converter for converting a received signal output from the radio frequency unit into a digital value for input to the processing unit.

The adjustment method comprising the following steps can be applied to the bias circuit of the first mode, i.e., the adjustment method comprises the steps of: connecting a radio wave signal generator to an antenna connecting end of the radio frequency unit so as to cause the received signal to be output from the radio frequency unit; in this condition, connecting a test processing unit in place of the processing unit; connecting to the test processing unit a control apparatus to which the received signal is to be input; and causing the control apparatus to execute the following steps. The steps that the control apparatus is caused to execute include: outputting an initial value of a digital bias value to the D/A converter through the test processing unit; subsequently measuring a radio frequency characteristic of the received signal output from the radio frequency unit in response to the initial value, calculating a target value for the digital bias value based on the measured radio frequency characteristic, and supplying the target value to the D/A converter through the test processing unit; measuring the radio frequency characteristic of the received signal output from the radio frequency unit in response to the target value and determining whether the measured radio frequency characteristic lies within specified limits; if the measured radio frequency characteristic lies within the specified limits, then determining the target value as a bias adjusting value to be applied to the MMIC; and if the measured radio frequency characteristic lies outside the specified limits, then recalculating the target value until the measured radio frequency characteristic comes within the specified limits.

The adjustment method comprising the following steps can be applied to the bias circuit of the second mode, i.e., the adjustment method comprises the steps of: connecting a radio wave signal generator to an antenna connecting end of the radio frequency unit so as to cause the received signal to be output from the radio frequency unit; in this condition, connecting a test processing unit in place of the processing unit and providing a control apparatus to be connected to the test processing unit; and causing the control apparatus to execute the following steps. The steps that the control apparatus is caused to execute include: outputting an initial value of a digital bias value to the D/A converter through the test processing unit; subsequently acquiring from the test processing unit a measurement result of a radio frequency characteristic of the received signal output from the radio frequency unit in response to the initial value, calculating a target value for the digital bias value based on the measurement result, and supplying the target value to the D/A converter through the test processing unit; determining whether the measurement result of the radio frequency characteristic of the received signal acquired from the test processing unit in response to the target value lies within specified limits; if the measurement result lies within the specified limits, then determining the target value as a bias adjusting value to be applied to the MMIC; and if the measurement result lies outside the specified limits, then recalculating the target value until the measurement result comes within the specified limits.

A radio frequency unit according to the present invention that achieves the above object comprises: at least one MMIC for outputting a signal to be transmitted from an antenna, and for processing a signal received by the antenna; an IF circuit to which the received signal processed by the MMIC is input; a control processor for outputting a bias value adjusting signal based on a bias value determined from a receive gain of the received signal output from the IF circuit and on a predetermined bias value; a bias circuit to which the bias value adjusting signal is input; and a radio frequency circuit containing at least one MMIC whose bias value is adjusted in accordance with the bias value adjusting signal output from the bias circuit.

Further, a radar apparatus according to the present invention that achieves the above object comprises the above radio frequency unit and the antenna connected to the radio frequency unit.

According to the present invention, since the IF signal output from the radio frequency unit and the transmit power of the antenna represent the characteristics containing the variations in radio frequency characteristics, other than the variations among the MMICs, caused by variations in connection losses between the MMICs (variations due to gold ribbon connection losses), variations in radio frequency characteristics dependent on the handling of the MMICs, and variations in radio frequency of waveguide conversion, adjusting the gate bias based on the IF output and the transmit power automatically achieves the two purposes of the gate bias adjustment, i.e., the adjustment of the optimum bias point of each MMIC and the adjustment of the radio frequency characteristics such as transmit power, receive gain, etc., and thus the adjustment can be accomplished with extremely high accuracy.

Usually, after the gate bias adjustment, the radio frequency unit is inspected for radio frequency characteristics in an inspection process before shipment from the factory; accordingly, by utilizing the equipment used for the inspection of the radio frequency characteristics, the present invention can be readily implemented without requiring any special equipment. Furthermore, while a drain current monitor circuit has been required in the prior art, the present invention eliminates the need for a drain current monitor circuit, and can thus reduce the cost. Further, since the gate bias adjusting value can be adjusted with high accuracy, and the adjustment can be made by software, the adjustment can be easily automated, achieving a reduction in time required for the adjustment and thus achieving an efficient and highly accurate bias adjustment.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given regarding the bias adjustment of a radio frequency unit in the conventional radar apparatus shown in FIGS. 1 to 2.

Figure 1:
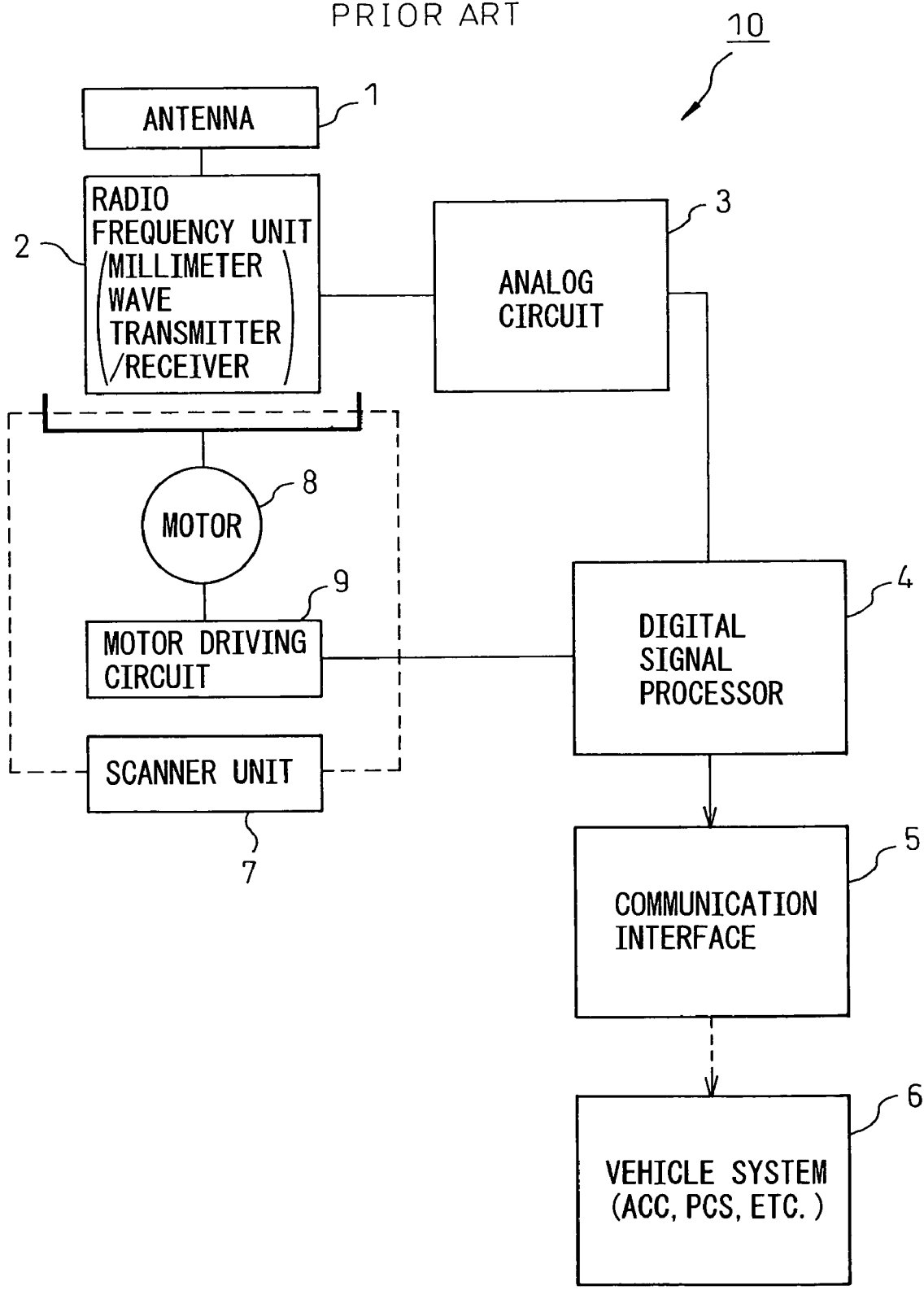
FIG. 1 is a block diagram schematically showing the configuration of a conventional millimeter wave radar apparatus.

FIG. 1 shows the configuration of the conventional millimeter wave radar apparatus 10. The millimeter wave radar apparatus 10 comprises a transmitting/receiving antenna 1, a radio frequency unit 2 connected to the transmitting/receiving antenna 1 to transmit and receive radio waves (millimeter waves), an analog circuit 3 incorporating a signal processing circuit for processing signals output from the radio frequency unit 2, a digital signal processor 4 for digitally processing signals output from the analog circuit 3, and a communication interface 5 for transmitting the signals processed by the digital signal processor 4 to a vehicle system 6 (ACC, PCS, etc.).

The antenna 1 and the radio frequency unit 2 are together scanned left and right by a motor 8 contained in a scanner unit 7. The motor 8 is driven by a motor driving circuit 9 which operates under the control of a signal supplied from the digital signal processor 4. The digital signal processor 4 converts the beat signal produced by interference between the received wave and the transmitted wave into a digital signal, analyzes the beat frequency in its processing circuit, and detects the target's position by computing distance, relative velocity, and angle information. The radio frequency unit 2 forming one component element of such a millimeter wave radar apparatus 10 generally comprises a radio frequency circuit constructed from a plurality of MMICs (Monolithic Microwave Integrated Circuits) and a bias circuit for operating the MMICs.

Each MMIC contains a mixer, multiplier, amplifier, switch, etc., but the optimum point of the gate bias value for the mixer, multiplier, amplifier, etc. varies in each MMIC. Further, in the radio frequency unit, since the transmit power and receive gain of the transmitter/receiver need to be adjusted to given target values, the bias value must be adjusted for each individual MMIC. Furthermore, since there exist variations in the gold ribbon connecting the MMICs, in the waveguide converter, and in the IF (Intermediate Frequency) circuit connected to the radio frequency circuit, besides variations among the MMICs, the bias adjustment has therefore been required.

Figure 2:
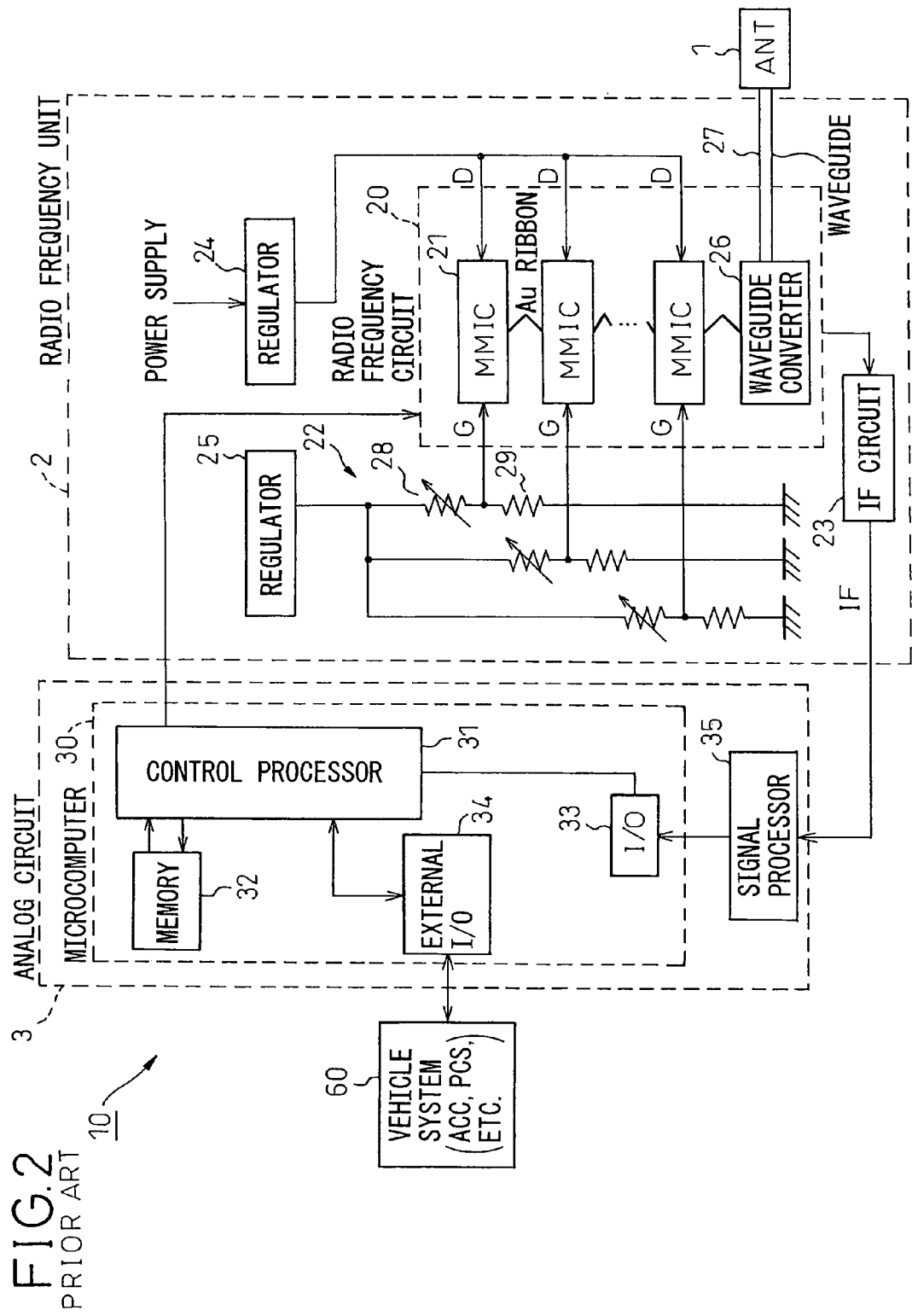
FIG. 2 is a block circuit diagram showing the configuration of a bias circuit incorporated in a radio frequency unit in the conventional millimeter wave radar apparatus.

FIG. 2 shows the configuration of the radio frequency unit 2 and analog circuit 3 in the conventional millimeter wave radar apparatus 10 shown in FIG. 1. The radio frequency unit 2 includes a radio frequency circuit 20 incorporating a plurality of MMICs 21, a bias circuit 22, and an IF circuit 23. Power is supplied to the radio frequency circuit 20 and the bias circuit 22 from a power supply circuit (not shown) through respective regulators 24 and 25.

The MMICs 21 built into the radio frequency circuit 20 have the functions of an oscillator, mixer, multiplier, amplifier, switch, etc., as described above, and are interconnected by a gold ribbon (labeled Au in the figure). The transmit signal output from the MMIC 21 at the final stage is fed through the waveguide converter 26 and the waveguide 27 and transmitted out from the antenna 1. The signal reflected by the target and received by the antenna 1 is input via the waveguide 27 and the waveguide converter 26 into the MMICs 21 for processing, and the received signal processed by the MMICs 21 is supplied to the IF circuit 23 and sent to the analog circuit 3.

The analog circuit 3 includes, in addition to the signal processing circuit 35, a microcomputer 30 comprising a control processor 31, a memory 32, an I/O 33, and an external I/O 34. The signal from the I/F circuit 23 is supplied via the signal processing circuit 35 and the I/O 33 to the control processor 31 for processing, and the processed signal is output via the external I/O 34 to the vehicle system 60.

The input side of each MMIC 21 in the radio frequency unit 2 is connected to a voltage dividing circuit comprising a trimmable resistor 28 and a conventional resistor 29 in the bias circuit 22. The bias circuit 22 divides the output voltage of the regulator 25 through the trimmable resistor 28 and the conventional resistor 29, and applies the resulting bias value to the MMIC 21. In the prior art, the resistance set value of each trimmable resistor 28 has been determined by examining the IF signal output from the IF circuit 23, and then, trimming of the trimmable resistor 28 has been performed using the thus set value.

However, once the trimming is done, the value of the trimmable resistor can no longer be changed; as a result, there has been the problem that even if a temperature monitor is added, temperature compensation cannot be performed, and besides, since determining whether the value is set correctly or not can only be checked in the inspection step, and therefore it is not possible to detect faults once the radar apparatus is shipped to the market.

The present invention is intended to solve the above problem, and the specific embodiments of the invention will be described in detail below. For simplicity of explanation, the same components as those used in the prior art millimeter wave radar apparatus 10 shown in FIGS. 1 and 2 will be referred to by the same reference numerals.

Figure 3:
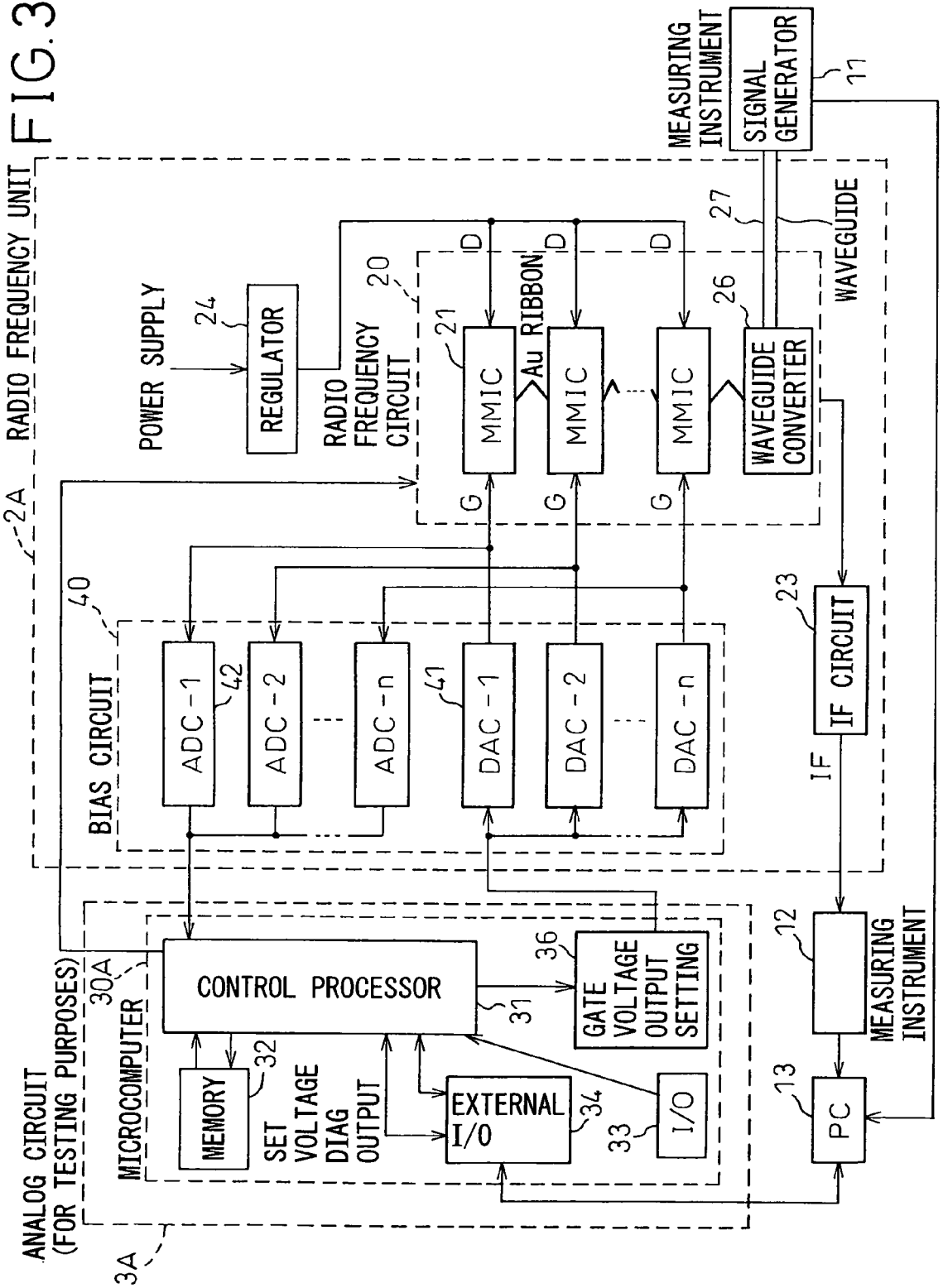
FIG. 3 is a block circuit diagram explaining the configuration of a first embodiment of a bias circuit incorporated in a radio frequency unit in a millimeter wave radar apparatus according to the present invention, and a method of bias adjustment for the same.

FIG. 3 is a diagram for explaining the configuration of a first embodiment of a bias circuit 40 incorporated in a radio frequency unit 2A in a millimeter wave radar apparatus according to the present invention, along with its connection to an analog circuit 3A provided for testing purposes, and a method of bias adjustment for the same. The radio frequency unit 2A includes, in addition to the bias circuit 40, a radio frequency circuit 20 and an IF circuit 23 which are identical to those shown in FIG. 1. Power from a power supply circuit not shown is supplied to the radio frequency circuit 20 through a regulator 24. The analog circuit 3A shown in FIG. 3 is for testing purposes (for bias adjustment) and is not actually used in the millimeter wave radar apparatus in which the radio frequency unit 2A is incorporated.

The MMICs 21 built into the radio frequency circuit 20 have the functions of an oscillator, mixer, multiplier, amplifier, switch, etc., as earlier described, and are interconnected by a gold ribbon. The transmit signal output from the MMIC 21 at the final stage is fed through the waveguide converter 26 and the waveguide 27 to the antenna side. In this embodiment, a signal generator 11 is connected in place of the antenna 1 shown in FIG. 2. The signal generator 11 is a measuring instrument that can generate the same signal as that received at the antenna 1. The signal generator 11 may be replaced by a power meter. The signal generated by the signal generator 11 is fed via the waveguide 27 and the waveguide converter 26 into the MMICs 21 for processing, and the signal processed by the MMICs 21 is supplied to the IF circuit 23. The IF signal output from the IF circuit 23 is supplied via a spectrum analyzer (designated SA in the figure) 12 and a personal computer (hereinafter abbreviated PC) 13 to the analog circuit 3A.

The bias circuit 40 of this embodiment comprises a plurality of D/A converters (D/AC-1 to D/AC-n) 41 connected to the inputs of the respective MMICs 21 in the radio frequency circuit 20, and a plurality of A/D converters (A/DC-1 to A/DC-n) 42 connected to the outputs of the respective D/A converters 41. On the other hand, the analog circuit 3A includes a microcomputer 30A comprising a control processor 31, a memory 32, an I/O 33, an external I/O 34, and a gate voltage output setting circuit 36. The output of the gate voltage output setting circuit 36 is connected to the input terminals of the respective D/A converters 41 in the bias circuit 40, and the outputs of the respective A/D converters 42 in the bias circuit 40 are coupled to the control processor 31.

The configuration shown in FIG. 3 is used when performing the bias adjustment by the bias circuit 40; therefore, as described above, the signal generator 11 as a measuring instrument is connected to the waveguide 27, and the output of the IF circuit 23 is coupled via the spectrum analyzer 12 as a measuring instrument and via the PC 13 to the external I/O 34 of the microcomputer 30A in the analog circuit 3 and fed to the control processor 31.

Figure 4:
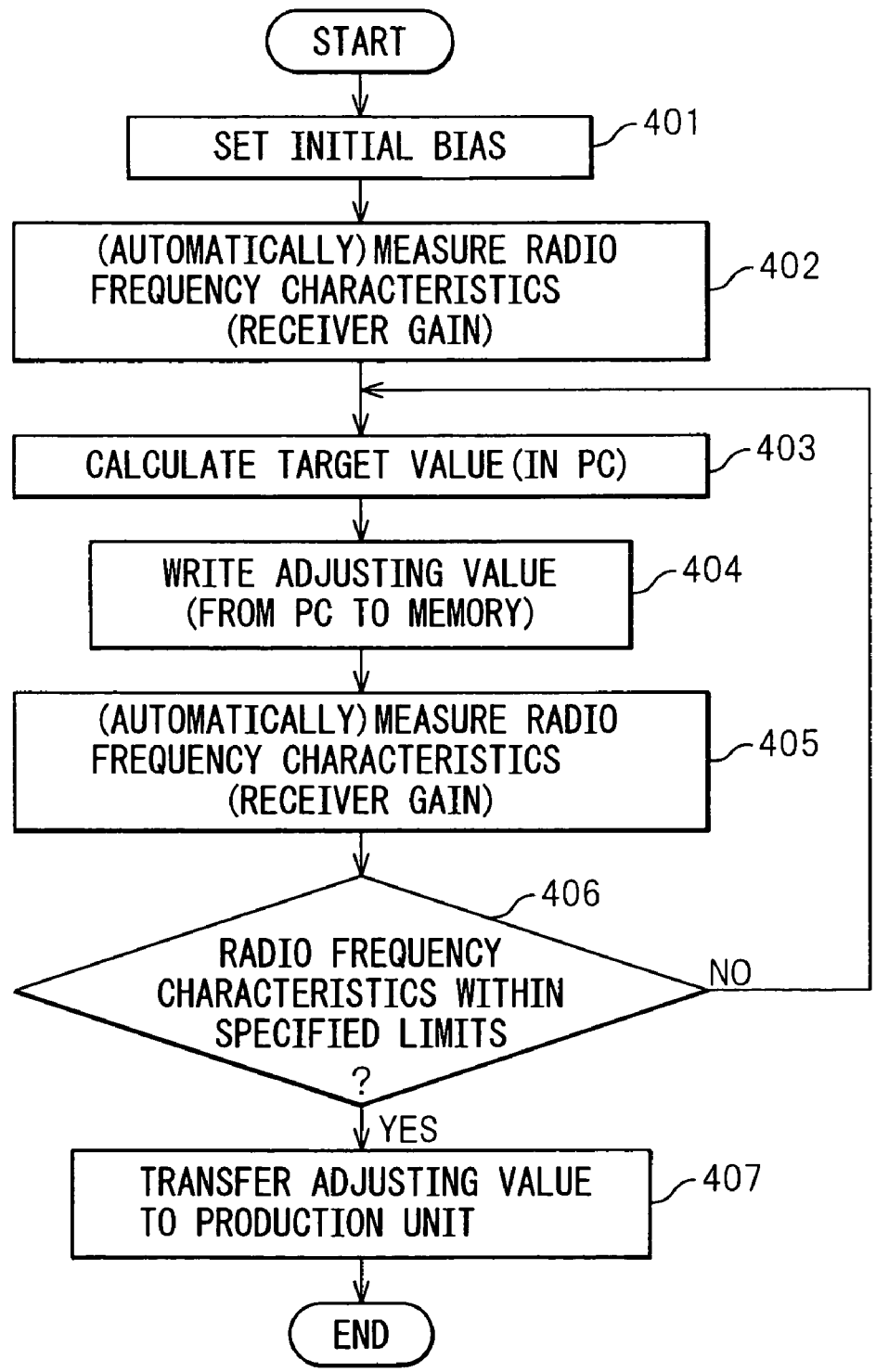
FIG. 4 is a flowchart explaining the bias adjustment method for the radio frequency unit shown in FIG. 3.

FIG. 4 is a flowchart for explaining the bias adjustment method implemented in the radio frequency unit 2A of FIG. 3 using the measuring instruments (signal generator 12 and spectrum analyzer 12). The processing steps shown in the flowchart are carried out by the PC 13 connected to the analog circuit 3A shown in FIG. 3.

In step 401, the initial bias value is set. The PC 13 connected to the analog circuit 3A sets a generally suitable value as the initial bias value by using a digital value, and sends this value to the control processor 31 via the external I/O 34. Then, the control processor 31 supplies this initial bias value (digital value) to the D/A converters 41 via the gate voltage output setting circuit 36, and the bias value converted to analog form is applied to the respective MMICs 21. With the thus set bias value, the MMICs 21 in the radio frequency circuit 20 receive the signal from the signal generator 11 and process the received signal, and the received signal thus processed is output from the IF circuit 23.

In step 402, the received signal output from the IF circuit 23 is frequency analyzed by the spectrum analyzer 12, and the result is fed to the PC 13. The PC 13 automatically measures the radio frequency characteristics based on the output of the spectrum analyzer 12, and detects the receive gain. In the next step 403, based on the receive gain measured in response to the initially set bias value, the PC 13 calculates the target bias value as the target value for the bias value to be applied to the MMICs 21. Then, in step 404, the target bias value is sent as a bias adjusting value to the microcomputer 30A in the analog circuit 3A, and the bias adjusting value is written to the memory 32 via the external I/O 34 and the control processor 31, while at the same time, the bias adjusting value is supplied to the D/A converters 41 via the gate voltage output setting circuit 36.

Then, in step 405, the MMICs 21 to which the bias adjusting value converted to analog form has been applied are again made to receive the signal from the signal generator 11, and the received signal output from the IF circuit 23 is frequency analyzed by the spectrum analyzer 12, and the result is fed to the PC 13. The PC 13 automatically measures the radio frequency characteristics of the received signal, and detects the receive gain of the radio frequency circuit 20 to which the bias adjusting value has been applied. In the next step 406, it is determined whether the detected receive gain lies within specified limits; if it is not within the specified limits, the process returns to step 403 to recalculate the target bias value for the MMICs 21, and the process from step 404 to step 406 is repeated. The process from step 403 to step 406 is repeated until it is determined in step 406 that the detected receive gain of the radio frequency circuit 20 lies within the specified limits.

If it is determined in step 406 that the detected receive gain of the radio frequency circuit 20 lies within the specified limits, the process proceeds to step 407 where the bias adjusting value retrieved from the memory 32 of the test analog circuit 3A is transferred to a memory of a production analog circuit (described hereinafter) which is combined with the radio frequency unit 2A thus measured.

Figure 5:
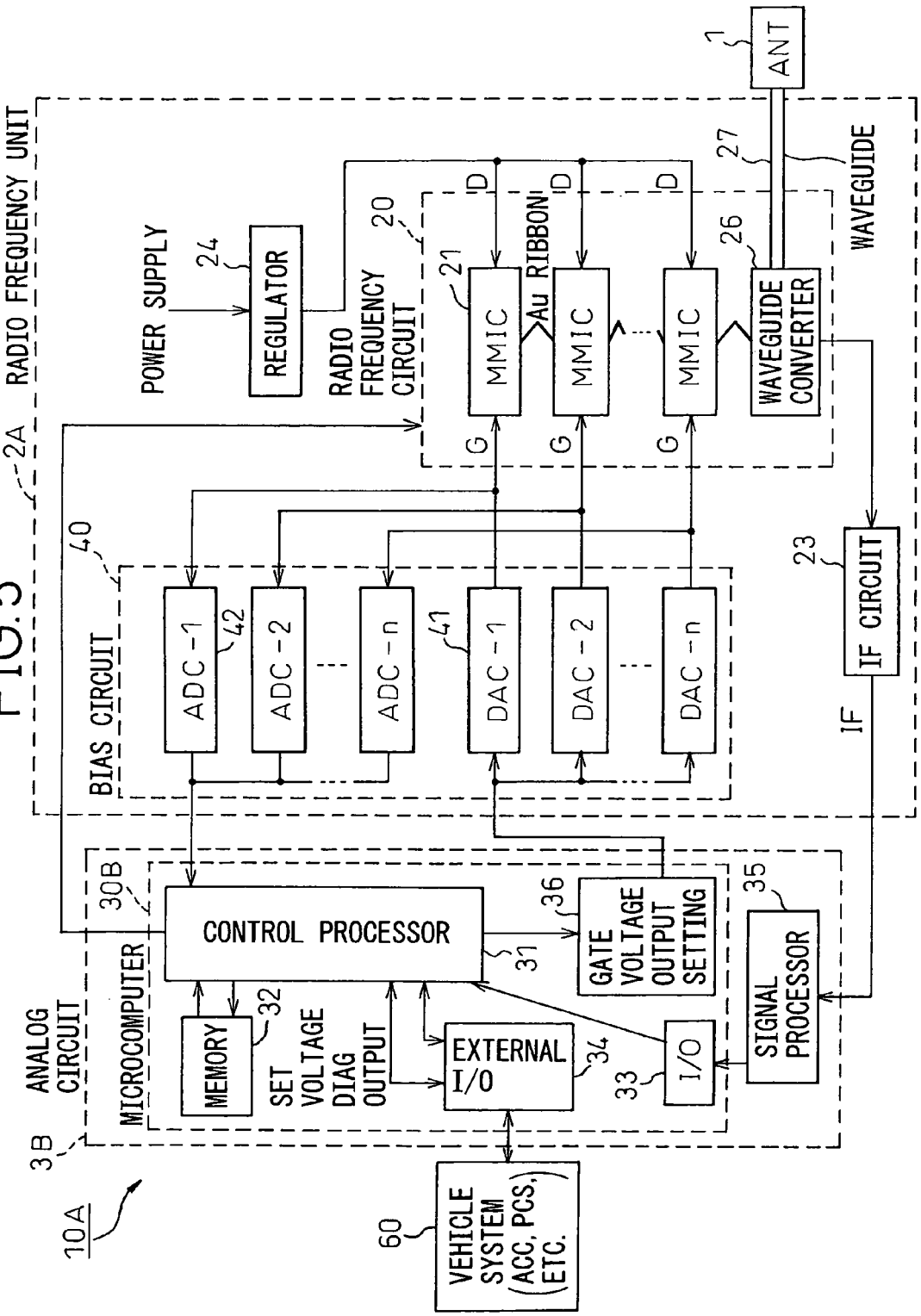
FIG. 5 is a block circuit diagram showing the configuration of the millimeter wave radar apparatus incorporating the radio frequency unit of the present invention adjusted by the adjustment method shown in FIGS. 3 and 4.

FIG. 5 is a diagram showing the configuration of the millimeter wave radar apparatus 10A incorporating the radio frequency unit 2A of the present invention adjusted by the adjustment method shown in FIGS. 3 and 4. The radio frequency circuit 20 in the radio frequency unit 2A is identical to the radio frequency circuit 20 shown in FIG. 3. The analog circuit 3B combined with the radio frequency unit 2A comprises a microcomputer 30B, which is identical in configuration to the microcomputer 30A of the test analog circuit 3A described with reference to FIG. 3, and a signal processing circuit 35 connected to the I/O 33. The bias adjusting value transferred under the control of the PC 13 at the time of testing is held in the memory 32 of the microcomputer 30B. The vehicle system 60 is connected to the external I/O 34.

In the millimeter wave radar apparatus 10A incorporating the radio frequency unit 2A according to the first embodiment of the present invention, the control processor 31 reads the bias adjusting value stored in the memory 32 of the microcomputer 30B in the analog circuit 3B, and supplies it, via the gate voltage output setting circuit 36 and the D/A converters 41, as a bias value to the MMICs 21 in the radio frequency circuit 20. The bias value applied to the MMICs 21 is constantly monitored by the control processor 31 via the A/D converters 42, and if the bias value applied to the MMICs 21 in the radio frequency circuit 20 deviates from the bias adjusting value stored in the memory 32, the control processor 31 corrects the bias value. In this way, the correct bias value is always applied to the MMICs 21 of the present invention.

The D/A converters 41 may be configured to be able to change the gate voltage output setting as needed if the bias value applied to the MMICs 21 in the radio frequency circuit 20 deviates from the bias adjusting value stored in the memory 32. In this case, the D/A converters 41 can digitally control the bias value for output to the MMICs 21.

In the first embodiment of the present invention, the adjustment can be made with an accuracy substantially equal to the measurement accuracy. More specifically, according to the present invention, when an adjustment is made so that the radio frequency circuit 20 will have a gain of 20 dB, for example, the adjustment can be made with an accuracy of ±1 dB or less, i.e., the gain of the radio frequency circuit 20 can be adjusted with an error not greater than 5%.

Figure 6:
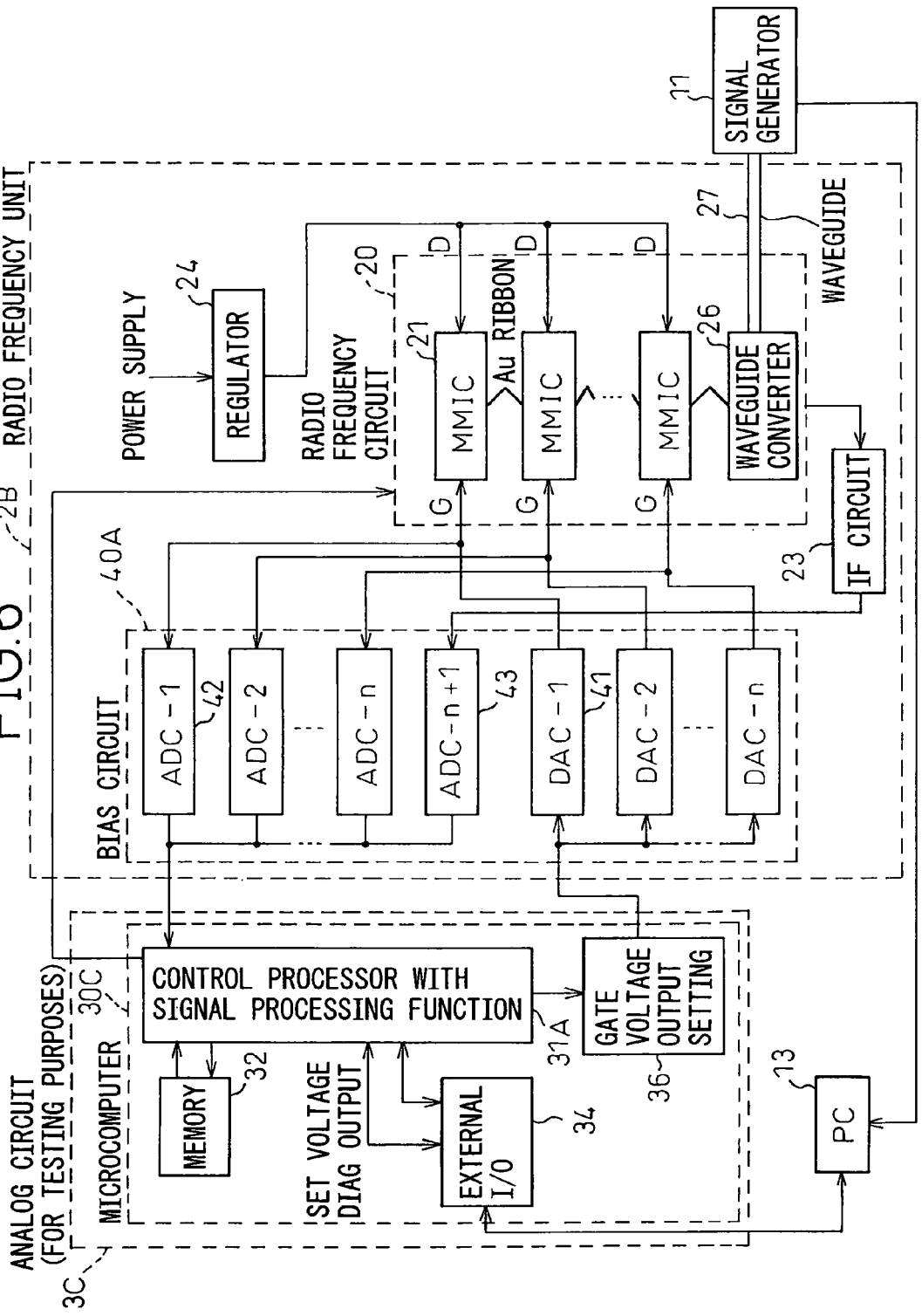
FIG. 6 is a block circuit diagram explaining the configuration of a second embodiment of a bias circuit incorporated in a radio frequency unit in a millimeter wave radar apparatus according to the present invention, and a method of bias adjustment for the same.

FIG. 6 is a diagram for explaining the configuration of a bias circuit 40A incorporated in a radio frequency unit 2B in a millimeter wave radar apparatus according to a second embodiment of the present invention, along with its connection to an analog circuit 3C, and a method of bias adjustment for the same. The radio frequency unit 2B includes, in addition to the bias circuit 40A, a radio frequency circuit 20 and an IF circuit 23 which are identical to those shown in the first embodiment. The radio frequency circuit 20 is the same as that shown in the first embodiment, and power is supplied to it from a power supply circuit (not shown) through the regulator 24. The analog circuit 3C shown in FIG. 6 is for testing purposes (for bias adjustment) and is not actually used in the millimeter wave radar apparatus in which the radio frequency circuit 20 is incorporated.

As in the first embodiment, the signal generator 11 as a measuring instrument capable of generating the same signal as that received at the antenna is connected in place of the antenna to the radio frequency circuit 20. The signal generated by the signal generator 11 is fed via the waveguide 27 and the waveguide converter 26 into the MMICs 21 for processing, and the signal processed by the MMICs 21 is supplied to the IF circuit 23. In the first embodiment, the IF signal output from the IF circuit 23 was supplied to the analog circuit 3B via the spectrum analyzer 12 and the PC 13, but in the second embodiment, the IF signal output from the IF circuit 23 is supplied, via an IF A/D converter (A/DC-n+1) 43, directly to the control processor 31A.

The bias circuit 40A of the second embodiment is identical in configuration to the bias circuit 40 of the first embodiment, except for the IF A/D converter 43, and comprises a plurality of D/A converters 41 connected to the respective MMICs 21 in the radio frequency circuit 20 and A/D converters 42 connected to the outputs of the respective D/A converters 41. On the other hand, the configuration of the analog circuit 3C of the second embodiment is substantially the same as that of the analog circuit 3A of the first embodiment, the only difference being that the I/O 33 is omitted. The output of the gate voltage output setting circuit 36 is connected to the input terminals of the respective D/A converters 41 in the bias circuit 40A, and the outputs of the respective A/D converters 42 in the bias circuit 40A are coupled to the control processor 31A.

The configuration shown in FIG. 6 is used when performing the bias adjustment by the bias circuit 40A, but differs from the first embodiment in that the IF signal output from the IF circuit 23 is supplied via the IF A/D converter 43 to the control processor 31A of the microcomputer 30C in the analog circuit 3C, and in that the spectrum analyzer placed in front of the PC 13 is omitted. In this embodiment also, the signal from the signal generator 11 is input to the PC 13.

Figure 7:
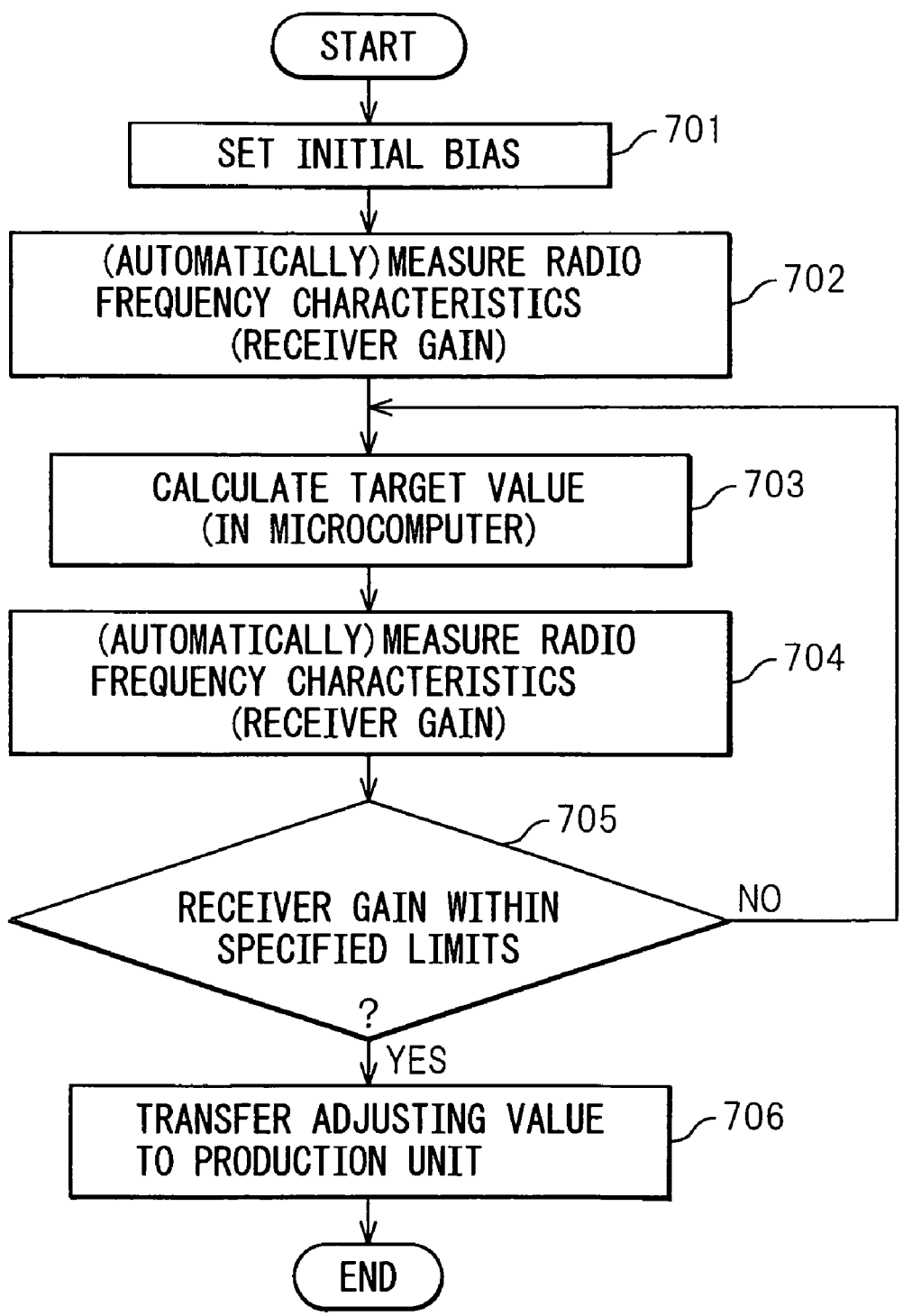
FIG. 7 is a flowchart explaining the bias adjustment method for the radio frequency unit shown in FIG. 6.

FIG. 7 is a flowchart explaining the bias adjustment method in the radio frequency unit 2 shown in FIG. 6, and the flowchart is carried out by the PC 13 shown in FIG. 6.

In step 701, the initial bias value is set. The PC 13 connected to the analog circuit 3C sets a generally suitable value as the initial bias value by using a digital value, and sends this value to the control processor 31A via the external I/O 34. Then, the control processor 31A supplies this initial bias value to the D/A converters 41 via the gate voltage output setting circuit 36, and the bias value converted to analog form is applied to the respective MMICs 21. With the thus set bias value, the MMICs 21 in the radio frequency circuit 20 receive the signal from the signal generator 11, and supplies the received signal to the IF circuit 23 which outputs the IF signal.

The IF signal output from the IF circuit 23 is converted by the IF A/D converter 43 into a digital value which is supplied to the control processor 31A of the microcomputer 30C in the analog circuit 3C. The control processor 31A of the second embodiment is provided with a signal processing function, and processes the IF signal supplied via the IF A/D converter 43 and supplies the processed received signal to the PC 13 via the external I/O 34.

In step 702, the PC 13 automatically measures the radio frequency characteristics based on the output of the external I/O 34, and detects the receive gain. In the next step 703, based on the receive gain measured in response to the initially set bias value, the PC 13 calculates the target bias value for the MMICs 21. The target bias value is written to the memory 32 via the external I/O 34 and the control processor 31, while at the same time, it is supplied to the D/A converters 41 via the gate voltage output setting circuit 36, and the target bias value converted to analog form is applied to each MMIC 21. The MMICs 21 in the radio frequency circuit 20 receives the signal from the signal generator 11 with the thus set target bias value, and the processed received signal is output as the IF signal from the IF circuit 23.

The IF signal output from the IF circuit 23 is converted by the IF A/D converter 43 into a digital value which is supplied to the control processor 31A of the microcomputer 30C in the analog circuit 3C. The control processor 31A processes the received signal supplied via the IF A/D converter 43, and supplies the processed received signal to the PC 13 via the external I/O 34. In step 704, the radio frequency characteristics of the received signal are automatically measured to detect the receive gain.

In the next step 705, it is determined whether the detected receive gain lies within specified limits; if it is not within the specified limits, the process returns to step 703 to recalculate the target bias value for the MMICs 21, and the process from step 704 to step 706 is repeated. The process from step 703 to step 705 is repeated until it is determined in step 705 that the detected receive gain lies within the specified limits.

If it is determined in step 705 that the detected receive gain lies within the specified limits, the process proceeds to step 706 where the bias adjusting value retrieved from the memory 32 of the test analog circuit 3C is transferred to a memory of a production analog circuit (described hereinafter) which is combined with the radio frequency unit 2B thus measured. In the second embodiment, since the need for the measurement by the spectrum analyzer is eliminated, and the signal used for processing the received signal of the radar apparatus is directly processed in the microcomputer 30C, the adjustment can be made with higher accuracy.

Figure 8:
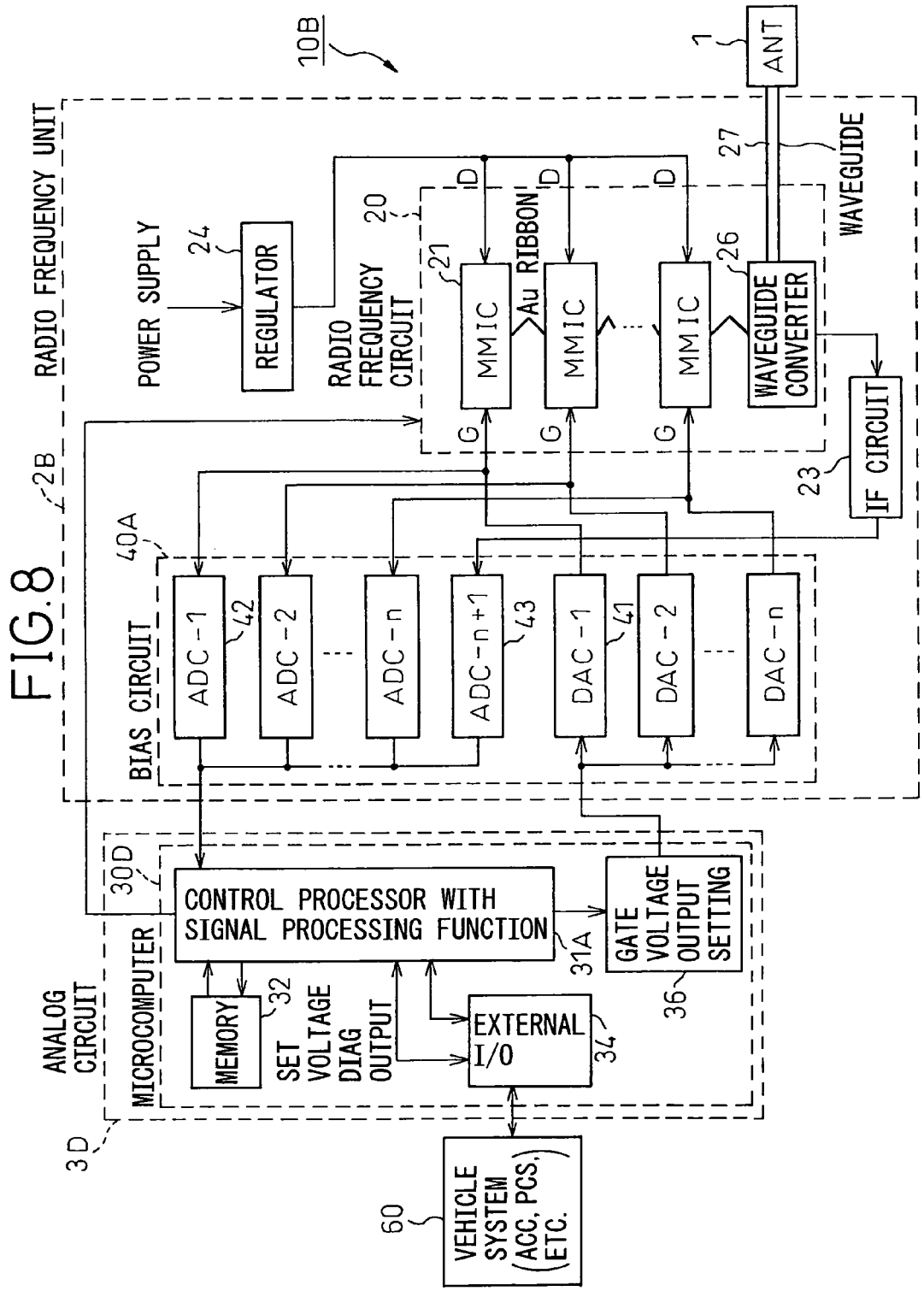
FIG. 8 is a block circuit diagram showing the configuration of the millimeter wave radar apparatus incorporating the radio frequency unit of the present invention adjusted by the adjustment method shown in FIGS. 6 and 7.

FIG. 8 is a diagram showing the configuration of the millimeter wave radar apparatus 10B incorporating the radio frequency unit 2B of the second embodiment of the present invention adjusted by the adjustment method shown in FIGS. 6 and 7. The radio frequency unit 2B is identical to the radio frequency unit 2B shown in FIG. 6. The analog circuit 3D combined with the radio frequency unit 2B comprises a microcomputer 30D which is identical in configuration to the microcomputer 30C of the test analog circuit 3C described with reference to FIG. 6. The bias adjusting value transferred under the control of the PC 13 at the time of testing is held in the memory 32 of the microcomputer 30D. The vehicle systems 60 is connected to the external I/O 34.

In the millimeter wave radar apparatus 10B incorporating the radio frequency unit 2B according to the second embodiment of the present invention, the control processor 31A reads the bias adjusting value stored in the memory 32 of the microcomputer 30D in the analog circuit 3D, and supplies it, via the gate voltage output setting circuit 36 and the D/A converters 41, as a bias value to the MMICs 21 in the radio frequency circuit 20. The bias value applied to the MMICs 21 is constantly monitored by the control processor 31A via the A/D converters 42, and if the bias value applied to the MMICs 21 in the radio frequency circuit 20 deviates from the bias adjusting value stored in the memory 32, the control processor 31A or the D/A converters 41 correct the bias value. In this way, the correct bias value is always applied to the MMICs 21 of the present invention.

The antenna 1 is connected to the waveguide 27 of the radio frequency circuit 20, and the signal received by the antenna 1, processed by the radio frequency circuit 20, and output from the IF circuit 23 is converted by the IF AD converter 43 into a digital signal which is supplied to the control processor 31A in the analog circuit 3D and processed by the signal processing function of the control processor 31A.

The detection and setting of the bias adjusting value of the D/A converters 41 in the radio frequency unit 2B may be performed in the adjusting circuit shown in FIG. 6, and the analog circuit 3B shown in FIG. 5, not the analog circuit 3D shown in FIG. 8 incorporating the control processor 31A having a signal processing function, may be employed as the analog circuit to be combined with the radio frequency unit 2B.

Although only some exemplary embodiments of this invention have been described in detail above, those skilled in the art will understand that many modifications are possible in the exemplary embodiments without departing from the novel teachings and advantages of this invention. Accordingly, all such modifications are intended to be included within the scope of this invention.

What is claimed is:

1. For use in a radar apparatus comprising a transmitting/receiving antenna, a radio frequency unit connected to said transmitting/receiving antenna and containing at least one monolithic microwave integrated circuit and a bias circuit for said monolithic microwave integrated circuit and a processing unit, connected to said radio frequency unit, for processing transmission and reception of radio waves, a method for adjusting an analog bias value to be applied to said bias circuit, comprising the steps of:
   providing in said bias circuit a D/A converter to be connected to a gate terminal of said monolithic microwave integrated circuit;
   connecting a radio wave signal generator to an antenna connecting end of said radio frequency unit so as to cause a received signal to be output from said radio frequency unit;
   in this condition, connecting a test processing unit in place of said processing unit;
   connecting to said test processing unit a control apparatus to which said received signal is to be input; and
   causing said control apparatus to execute the steps of:
   outputting an initial value of a digital bias value to said D/A converter through said test processing unit;
   subsequently measuring a radio frequency characteristic of the received signal output from said radio frequency unit in response to said initial value, calculating a target value for said digital bias value based on said measured radio frequency characteristic, and supplying said target value to said D/A converter through said test processing unit;
   measuring the radio frequency characteristic of the received signal output from said radio frequency unit in response to said target value and determining whether said measured radio frequency characteristic lies within specified limits;
   if said measured radio frequency characteristic lies within said specified limits, then determining said target value as a bias adjusting value to be applied to said monolithic microwave integrated circuit; and
   if said measured radio frequency characteristic lies outside said specified limits, then recalculating said target value until said measured radio frequency characteristic comes within said specified limits.

2. A method of bias adjustment for a radio frequency unit in a radar apparatus as claimed in claim 1, further comprising the steps of:
   providing in said test processing unit a storing means for storing the initial value or target value of said bias value; and
   said control apparatus outputting said calculated target value of said digital bias value to said D/A converter through said test processing unit, while at the same time, storing said calculated target value in said storing means.

3. A method of bias adjustment for a radio frequency unit in a radar apparatus as claimed in claim 2, further comprising the steps of:
   providing in said radio frequency unit an A/D converter for converting an output of said D/A converter into a digital bias value for input to said processing unit; and
   if the bias value of said monolithic microwave integrated circuit output from said A/D converter deviates from the target value stored in said storing means, then said control apparatus correcting the digital bias value to be output from said processing unit to said D/A converter.

4. A method of bias adjustment for a radio frequency unit in a radar apparatus as claimed in claim 2, further comprising the step of:
   said control apparatus reading said determined target value of said digital bias value from said storing means and writing said target value to a storing means provided in the processing unit actually incorporated in said radar apparatus.

5. A method of bias adjustment for a radio frequency unit in a radar apparatus as claimed in claim 4, further comprising the steps of:
   providing in said radio frequency unit an A/D converter for converting an output of said D/A converter into a digital bias value for input to said processing unit; and
   if the bias value of said monolithic microwave integrated circuit output from said A/D converter deviates from the target value stored in said storing means, then said control apparatus correcting the digital bias value to be output from said processing unit to said D/A converter.

6. For use in a radar apparatus comprising a transmitting/receiving antenna, a radio frequency unit connected to said transmitting/receiving antenna and containing at least one monolithic microwave integrated circuit and a bias circuit for said monolithic microwave integrated circuit, and a processing unit, connected to said radio frequency unit, for processing transmission and reception of radio waves, a method for adjusting an analog bias value to be applied to said bias circuit, comprising the steps of:

providing in said bias circuit a D/A converter to be connected to a gate terminal of said monolithic microwave integrated circuit and an A/D converter for converting a received signal output from said radio frequency unit into a digital value for input to said processing unit;

connecting a radio wave signal generator to an antenna connecting end of said radio frequency unit so as to cause said received signal to be output from said radio frequency unit;

in this condition, connecting a test processing unit in place of said processing unit and providing a control apparatus to be connected to said test processing unit; and causing said control apparatus to execute the steps of:

outputting an initial value of a digital bias value to said D/A converter through said test processing unit;

subsequently acquiring from said test processing unit a measurement result of a radio frequency characteristic of the received signal output from said radio frequency unit in response to said initial value, calculating a target value for said digital bias value based on said measurement result, and supplying said target value to said D/A converter through said test processing unit;

determining whether the measurement result of the radio frequency characteristic of said received signal acquired from said test processing unit in response to said target value lies within specified limits;

if said measurement result lies within said specified limits, then determining said target value as a bias adjusting value to be applied to said monolithic microwave integrated circuit; and if said measurement result lies outside said specified limits, then recalculating said target value until said measurement result comes within said specified limits.

7. A method of bias adjustment for a radio frequency unit in a radar apparatus as claimed in claim 6, further comprising the steps of:

providing in said test processing unit a storing means for storing the initial value or target value of said bias value; and said control apparatus outputting said calculated target value of said digital bias value to said D/A converter through said test processing unit, while at the same time, storing said calculated target value in said storing means.

8. A method of bias adjustment for a radio frequency unit in a radar apparatus as claimed in claim 7, further comprising the steps of:

providing in said radio frequency unit an A/D converter for converting an output of said D/A converter into a digital bias value for input to said processing unit; and if the bias value of said monolithic microwave integrated circuit output from said A/D converter deviates from the target value stored in said storing means, then said control apparatus correcting the digital bias value to be output from said processing unit to said D/A converter.

9. A method of bias adjustment for a radio frequency unit in a radar apparatus as claimed in claim 7, further comprising the step of:

said control apparatus reading said determined target value of said digital bias value from said storing means and writing said target value to a storing means provided in the processing unit actually incorporated in said radar apparatus.

10. A method of bias adjustment for a radio frequency unit in a radar apparatus as claimed in claim 9, further comprising the steps of:

providing in said radio frequency unit an A/D converter for converting an output of said D/A converter into a digital bias value for input to said processing unit; and if the bias value of said monolithic microwave integrated circuit output from said A/D converter deviates from the target value stored in said storing means, then said control apparatus correcting the digital bias value to be output from said processing unit to said D/A converter.

* * * * *